UNITED STATES PATENT OFFICE.

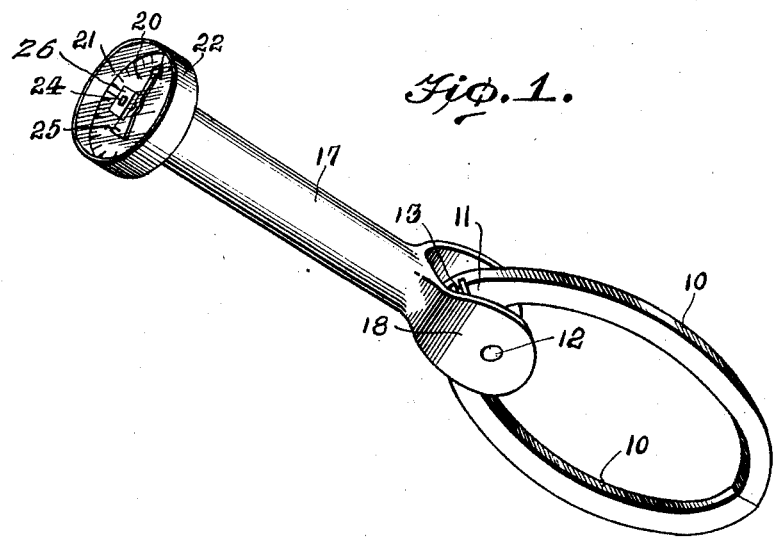
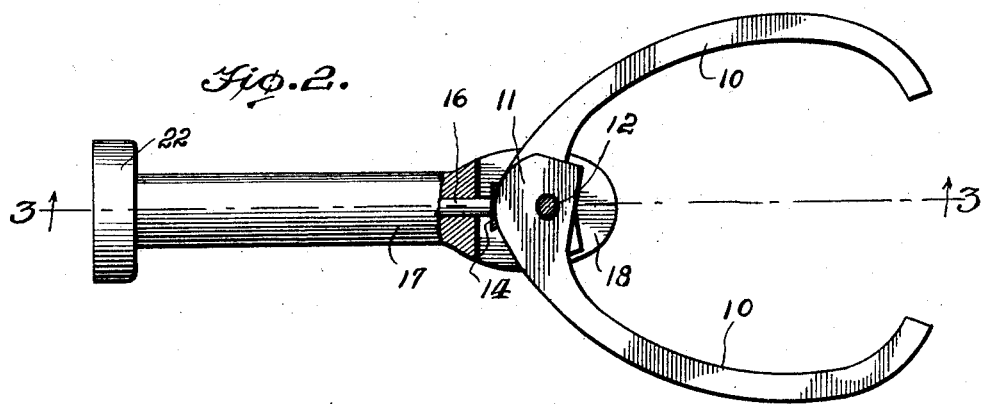

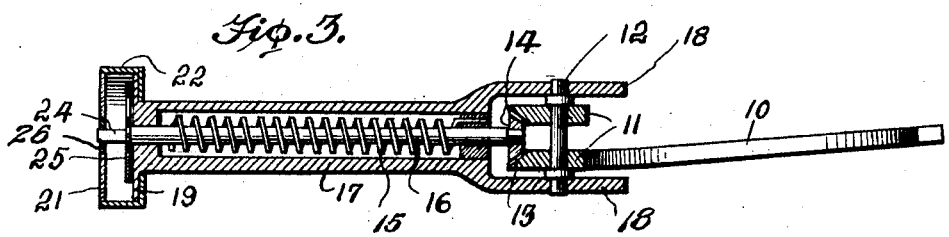
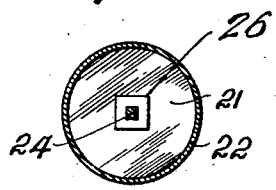
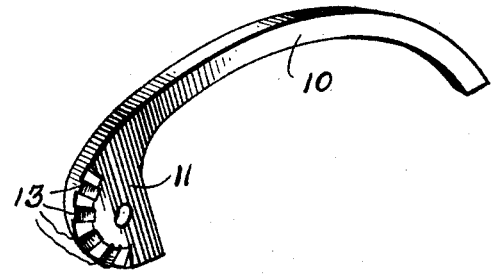
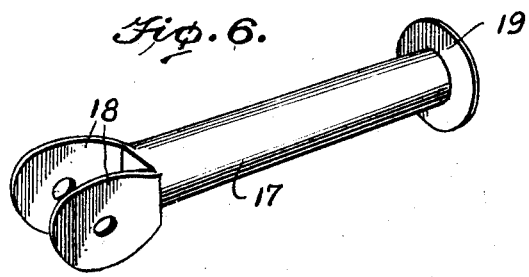

GODFREY HUNSLEY FOX, OF SEATTLE, WASHINGTON.

GRADUATED CALIPERS.

1,385,910.  Specification of Letters Patent.  Patented July 26, 1921.

Application filed July 20, 1920. Serial No. 397,686.

*To all whom it may concern:*

Be it known that I, GODFREY HUNSLEY FOX, a citizen of the United States, residing at Seattle, in the county of King and State of Washington, have invented new and useful Improvements in Graduated Calipers, of which the following is a specification.

My present invention has reference to improvements in calipers.

My primary object is to provide a pair of calipers with means whereby measurements taken thereby are accurately indicated, so that the necessity of retaining the legs spread in conveying the measurement will not be necessary.

A further object is the production of a pair of calipers in which the legs thereof are spring influenced to a closed position, and in which turnable means is provided for spreading the legs, indicating means being associated with said turnable means.

It is a still further object to produce a pair of calipers in which the legs thereof are operated to spread position by turnable means, the latter being spring influenced for normally retaining the points of the legs in contacting engagement as well as for exerting a tension against the legs to increase the accuracy in the measurement taken thereby, the said turnable means including an indicating finger that works over a dial whereby measurements taken by the caliper are indicated thereon, such measurements being noted by the operator so that the retaining of the caliper legs in spread condition will not be necessitated in conveying the measurements.

The foregoing, and other objects which will appear as the nature of the invention is better understood, may be accomplished by a construction, combination and operative arrangement of parts, such as is disclosed by the drawings.

In the drawings:—

Figure 1 is a perspective view of a pair of calipers constructed in accordance with this invention.

Fig. 2 is a side elevation, parts being broken away and in section and showing the legs spread.

Fig. 3 is a sectional view approximately on the line 3—3 of Fig. 2.

Fig. 4 is a sectional view approximately on the line 4—4 of Fig. 3.

Fig. 5 is a perspective view looking toward the inner face of one of the leg members.

Fig. 6 is a similar view of the sleeve carrying device.

The legs 10 of my improved calipers are curved toward each other so that the outer ends thereof are brought into contacting engagement. The inner ends of each of the legs is widened inwardly, as at 11, and for the sake of convenience, I will hereinafter refer to the said laterally widened portions as heads. The outer edge of each of the heads is rounded, being struck from a pivoted opening in the said heads. The outer edges are also beveled inwardly from the connection of the leg with the free end of the head, and these inclined and depressed portions are formed with teeth 13. The headed portions of the legs 10 are free mounted on a pivot 12 that has enlargements or shoulders that contact with the outer faces of the heads to prevent the spreading of the legs away from each other.

The beveled toothed portions 13 of the heads of the legs are engaged by a pinion 14, that has a shaft 16 that passes through suitable bearing openings in the ends of a tubular member or sleeve 17. The sleeve has one of its ends formed with spaced extensions in the nature of ears 18 which have alining openings and that receive therein the ends of the shaft 12. The opposite or outer end of the sleeve 17 is provided with an annular disk-like flange 19. Having one end secured to the shaft or stem 16 and its other end secured to the block that closes the bore of the said sleeve, at the end thereof which is formed with the ears, is a coil spring 15. This spring normally holds the shaft in one position so that the ends of the legs 10 are in contacting engagement.

The outer face of the flange 19 has radially disposed indicating marks 20 thereon, and the end of the shaft 16 that extends beyond the flanged end 19 of the sleeve 17 is squared, and on the said squared portion is secured an indicating hand 25.

Surrounding the flange 19 is a flat endless band or ring 22 that has its inner edge provided with an inturned flange that contacts with the inner face of the flange 19. The outer face of the ring or band 22 is closed by a transparent plate 21, the same having centrally embedded therein a metallic plate 26 in which the outer squared end 24 of the shaft 16 is secured.

By turning the head provided by the ring or band 22 and the flanged ends thereof, which, of course, includes the transparent plate 21, the shaft 16 will be also turned which, revolving the pinion 14 that meshes with the teeth 13 of the legs 10 will spread the said legs. When proper measurement has been made by the caliper legs the hand 25, will indicate the same on the degree marks 21 on the outer face of the flange 19. This is recorded by the operator who then releases the head permitting the spring 15 to turn the shaft 16 and returning the legs 10 to initial contacting engagement. Of course, a great number of measurements may be taken by the calipers each being recorded by the operator, and thus it will be seen that the necessity of holding the legs open for transferring measurements will be entirely and successfully overcome.

The drawings are, of course, merely illustrative showing a satisfactory embodiment of the improvement as it now appears to me, and from which such changes may be made as fall within the scope of what is claimed.

Having thus described the invention, what I claim is:—

1. A caliper including two pivotally connected legs having their inner ends headed and provided with teeth, a pinion engaging the teeth, a spring influenced shaft for the pinion, a sleeve inclosing the shaft and having bearings for the pivot which connects the legs of the caliper.

2. A caliper including two curved legs that have their points normally in contacting engagement and their opposite ends widened inwardly to provide heads, the outer edges of the heads being beveled and formed with teeth, a sleeve having a bifurcated end in which the heads of the legs are received, pivoting means between the said end of the sleeve and the heads of the legs, a pinion engaging the toothed portions of the heads, a shaft therefor, passing through the sleeve, spring means between the shaft and sleeve for influencing the former to one position for retaining the points of the caliper legs in contacting engagement, a graduated flange on the outer end of the sleeve, an indicator hand secured on the shaft and arranged over the flange, a hollow revoluble head on the flange having a transparent outer face to which the shaft is secured, as and for the purpose set forth.

In testimony whereof I affix my signature.

GODFREY HUNSLEY FOX.